United States Patent
Peureux et al.

(10) Patent No.: US 9,970,691 B2
(45) Date of Patent: May 15, 2018

(54) EQUIPMENT INCLUDING A HEAT PUMP FOR HEATING AN EXTERNAL FLUID WITH A LARGE TEMPERATURE DIFFERENTIAL

(71) Applicant: ELECTRICITE DE FRANCE, Paris (FR)

(72) Inventors: Jean-Louis Peureux, Villethierry (FR); Ali Bourig, Champagne sur Seine (FR); Assaad Zoughaib, Rambouillet (FR); Karim Besbes, Creteil (FR)

(73) Assignee: Electricite de France, Paris (FR)

( * ) Notice: Subject to any disclaimer, the term of this patent is extended or adjusted under 35 U.S.C. 154(b) by 394 days.

(21) Appl. No.: 14/419,004

(22) PCT Filed: Jul. 16, 2013

(86) PCT No.: PCT/FR2013/051701
§ 371 (c)(1),
(2) Date: Feb. 2, 2015

(87) PCT Pub. No.: WO2014/020255
PCT Pub. Date: Feb. 6, 2014

(65) Prior Publication Data
US 2015/0168034 A1    Jun. 18, 2015

(30) Foreign Application Priority Data

Aug. 2, 2012   (FR) .................... 12 57562

(51) Int. Cl.
| F25D 17/02 | (2006.01) |
| F25B 30/02 | (2006.01) |
| F25B 27/02 | (2006.01) |

(52) U.S. Cl.
CPC ............. *F25B 30/02* (2013.01); *F25B 27/02* (2013.01); *F25B 2309/061* (2013.01); *Y02A 30/274* (2018.01)

(58) Field of Classification Search
CPC .... F25B 27/02; F25B 2309/061; F25B 9/008; D06F 58/206
See application file for complete search history.

(56) References Cited

U.S. PATENT DOCUMENTS

2003/0140649 A1* 7/2003 Suzuki ................. B01J 20/041
                                                      62/474
2005/0044885 A1* 3/2005 Pearson .................. F25B 1/02
                                                      62/512

(Continued)

FOREIGN PATENT DOCUMENTS

| DE | 103 27 953 A1 | 1/2004 |
| DE | 10 2008 047 753 A1 | 3/2010 |

OTHER PUBLICATIONS

Yu et al., "A thermodynamic analysis of a transcritical cycle with refrigerant mixture R32/R290 for a small heat pump water heater," Energy and Buildings, Lausanne, CH, vol. 42(12), pp. 2431-2436 (Dec. 1, 2010).

*Primary Examiner* — Elizabeth Martin
(74) *Attorney, Agent, or Firm* — Drinker Biddle & Reath LLP

(57) ABSTRACT

An equipment including a heat pump for heating with a large temperature differential an external fluid, said heat pump including: first and second heat exchangers; a coolant; a coolant circuit including a compression unit connected to an outlet of the first heat exchanger and to an inlet of the second heat exchanger and an expansion unit connected to an outlet of the second heat exchanger and to an inlet of the first heat exchanger, wherein the coolant is one of the coolants selected from among a hydrofluorocarbon coolant and a hydrofluoroolefin coolant, and wherein the second heat exchanger and the coolant circuit are suitable for circulating the coolant in a transcritical cycle.

2 Claims, 3 Drawing Sheets

(56) References Cited

U.S. PATENT DOCUMENTS

| | | | |
|---|---|---|---|
| 2005/0066538 A1* | 3/2005 | Goldberg | D06F 58/206 34/218 |
| 2005/0086824 A1* | 4/2005 | Ono | D06F 58/206 34/62 |
| 2007/0169367 A1* | 7/2007 | Tadano | D06F 58/206 34/77 |
| 2013/0047638 A1* | 2/2013 | Okruch, Jr. | F25B 30/06 62/79 |

* cited by examiner

EQUIPMENT INCLUDING A HEAT PUMP FOR HEATING AN EXTERNAL FLUID WITH A LARGE TEMPERATURE DIFFERENTIAL

CROSS-REFERENCE TO RELATED APPLICATIONS

This application is the U.S. national phase of the International Patent Application No. PCT/FR2013/051701 filed Jul. 16, 2013, which claims the benefit of French Application No. 12 57562 filed Aug. 2, 2012, the entire content of which is incorporated herein by reference.

FIELD

The invention relates to equipment including a heat pump for heating an external fluid with a large temperature differential.

BACKGROUND

In industry, the demand for heat within a temperature range of 60° C. to 150° C. corresponds, among other things, to heating an external fluid (liquid or gas) with a large temperature differential between an initial temperature and a target temperature. The source fluids used as heat sources, from which heat is extracted, are usually liquid or gaseous effluents. The temperature differential may vary with the flow rate of these effluents.

The invention applies in particular:
  to the heating of liquids such as water, wash water or other process fluids, in heating systems or other systems,
  to the heating of gas for industrial drying, heating of rooms, or other uses.

In particular, without the invention being limited to such an application, drying applications are widespread and are used in many fields: paper, food processing, waste water treatment, textiles, wood, paint, etc. The distribution of energy consumption associated with drying in France is as follows: 39% for the paper/cardboard industry, 23% for the agribusiness sector, 13% for chemistry, 11% for the materials sector, 2% in metallurgy, 2% in textile, and 10% for other industries. There are estimated to be just over 13,000 industrial drying facilities in France, which use a wide range of technologies. Convection drying is the most common method used industrially. The method consists of circulating a stream of gas that is as hot and dry as possible, over a material to be dried. This gas stream, usually air, provides the heat required to evaporate the liquid contained in the material, and carries away the (water) steam formed. The gas cools and gains humidity between its entering and exiting the drying facility, while the progressively dried material grows warmer.

One solution for achieving a large temperature differential when heating with an external fluid is to collect heat from a source fluid, which in the case of drying is the humid air generated by the drying facility.

To do this, it is known to use heat exchangers, such as tubular heat exchangers, finned heat exchangers with intermediate fluid, heat pipe exchangers, plate heat exchangers, or spiral heat exchangers. Specifications provided by the exchanger manufacturers indicate a thermal efficiency of between 40% and 90%. However, this ratio does not mean that the energy available in the hot (and humid) effluent will be recovered at such a yield. In the case of drying, for example, a simple exchanger between the extracted humid air and the incoming dry air only recovers a small amount of the thermal energy extracted from the humid air to increase the temperature of the incoming dry air. For high drying temperatures, it represents less than 8% of the energy introduced into the drying facility.

To contribute to the reduction of energy usage and $CO_2$ emissions, the development of heat pumps (HP) is an attractive technological option for heating an external fluid.

A heat pump typically comprises a first heat exchanger, forming the evaporator, whose outlet is connected to the inlet of a second heat exchanger, forming the condenser, with a compression unit in between. The condenser outlet is connected to the evaporator inlet by means of an expansion unit. A coolant can thus flow between the evaporator and condenser to collect heat from the source fluid at the evaporator, and transfer heat to the external fluid at the condenser. In the case of drying, the extracted air can be cooled through the heat pump's evaporator (with condensation of the moisture), and the incoming air heated through the condenser to bring it to the desired temperature.

Drying facilities on record in France (for drying wood and sludge) confirm that heat pumps can reduce energy consumption.

However, conventional heat pumps can only achieve target temperatures limited to 60° C. In addition, the conventional thermodynamic cycles implemented in such heat pumps cannot reach very high condensation temperatures without crippling heat pump performance. The performance of existing heat pumps is therefore limited in the case of heating with large temperature differentials, and realistically they are not cost-effective.

To increase the performance of heat pumps for applications with large temperature differentials, particularly for the production of hot water in the residential and small business sectors, it is known to use $CO_2$ heat pumps with a transcritical cycle. This solution is effective up to 90° C. due to the very high associated pressures.

Heat pumps using a hydrofluorocarbon (HFC) coolant in a transcritical cycle are described in the article "A Thermodynamic analysis of a transcritical cycle with refrigerant mixture R32/R290 for a small heat pump water heater," Yu et al, Vol. 42, No. 12, p. 2431-2436, Dec. 1, 2010, and in document DE 103 27 953. Similarly to $CO_2$ heat pumps with a transcritical cycle, these heat pumps are used for domestic applications such as heating water, for temperatures not exceeding 90° C. However, such heat pumps are not suitable for industrial applications where the temperatures to be reached are very high, in particular above 90° C., more particularly above 100° C., preferably above 120° C., and for example up to 150° C.

It is also known, for example from document DE 10 2008 047 753, to use heat pumps in a cascade arrangement. This arrangement provides an overall increase in performance due to the reduced temperature differential seen by each heat pump and to the possibility of adapting the coolant to the conditions of each heat pump. The more discrete the system the better the performance. In practice, however, criteria related to economic profitability limit the system to two heat pumps.

There is therefore a need for equipment for high temperature drying applications, and more generally high temperature heating applications with large temperature differentials, providing satisfactory performance and economic viability.

SUMMARY

The invention aims to overcome the problems described above.

For this purpose, a first aspect of the invention proposes equipment comprising a heat pump for heating with a large temperature differential an external fluid from a source fluid, said heat pump comprising:
- first and second heat exchangers adapted to exchange heat respectively with the source fluid located in the vicinity of the first heat exchanger and the external fluid located in the vicinity of the second heat exchanger, each of said first and second heat exchangers having a inlet and an outlet,
- a coolant selected from among a hydrofluorocarbon coolant and a hydrofluoroolefin coolant,
- a coolant circuit adapted to circulate the coolant between the first and second heat exchangers, said coolant circuit comprising a compression unit having an inlet connected to the outlet of the first heat exchanger and an outlet connected to the inlet of the second heat exchanger, and an expansion unit having an inlet connected to the outlet of the second heat exchanger and an outlet connected to the inlet of the first heat exchanger,
- wherein the second heat exchanger and the coolant circuit of the heat pump are suitable for circulating the coolant in a transcritical cycle,
- wherein the heat pump is suitable for heating with a temperature differential greater than 20° C., preferably greater than 30° C., in particular greater than 40° C., more particularly greater than 60° C., and allowing achieving a high target temperature Tc that is greater than 90° C., and wherein said equipment further comprises:
- a chamber having an inlet and an outlet, the first and second heat exchangers being respectively arranged near the outlet and near the inlet of the chamber,
- a treatment system located in the chamber, the inlet and the outlet of the chamber being respectively arranged upstream and downstream of the treatment system,
- a circuit of external fluid, adapted to circulate the external fluid successively in the vicinity of the second heat exchanger and in the vicinity of the treatment system, said external fluid circuit being further adapted to circulate the external fluid downstream of the treatment system and in the vicinity of the first heat exchanger, as the source fluid, such that the external fluid transfers heat as it passes the treatment system, with a large temperature differential between the external fluid upstream of the treatment system and the external fluid downstream of the treatment system.

The use of a hydrofluorocarbon (HFC) coolant or a hydrofluoroolefin (HFO) coolant in a transcritical cycle offers two main advantages. On one hand, the coolant remains at a constant temperature during the evaporation phase at the first heat exchanger, which is of particular interest for example when recovering heat from condensation. On the other hand, as the passage of the coolant through the second heat exchanger can occur in a transcritical system, the temperature changes all along the second heat exchanger are thus mirrored in the reheating of the external fluid. Appropriately pairing the coolant used and the intended application optimizes the energy efficiency of the heat pump, which is one of the determining factors for economic viability. The heat pump performance is thus considerably improved.

In addition, the heat pump used in the equipment according to the invention allows developing significant heat generating capacities, in particular exceeding 100 kW, which from a source fluid at a moderate temperature, in particular above 40° C., more particularly above 50° C. and for example up to 70° C., allows reaching high target temperatures, in particular above 90° C., more particularly above 100° C., preferably above 120° C., and for example up to 150° C. These capacities combined with the particular arrangement of the treatment system relative to the external fluid circuit in the chamber and to the first and second heat exchangers make the equipment particularly suitable for industrial applications and in particular for industrial drying facilities.

The coolant has a critical point, with a critical temperature and a critical pressure. The compression unit may be adapted to compress the coolant so that said coolant simultaneously presents, at the outlet of the compression unit and the inlet of the second heat exchanger, a supercritical pressure greater than the critical pressure and a supercritical temperature greater than the critical temperature.

In addition, the second heat exchanger may be a gas cooler adapted to cool the coolant in a supercritical fluid state, said coolant simultaneously being at a supercritical pressure greater than the critical pressure and at a supercritical temperature greater than the critical temperature as it enters the gas cooler, and the cooling of the coolant taking place at constant supercritical pressure.

In one particular embodiment, the coolant may be the hydrofluorocarbon coolant R-32.

The heat pump may be placed within the chamber.

In particular, the treatment system may be a drying rack intended to receive a material to be dried, the external fluid circuit being suitable for circulating air successively in the vicinity of the second heat exchanger, in the vicinity of the drying rack, and in the vicinity of the first heat exchanger.

The usage of the heat pump as defined above in drying equipment allows introducing a large amount of energy upstream of the drying rack, to heat or dehumidify the incoming air, or during the phase of dehydrating the material. In addition, this implementation makes use of the energy contained in the humid air that is discharged. The energy contained in the discharged humid air, known as waste heat, has value which represents an attractive potential for saving energy through increased energy efficiency in the drying process, thus reducing costs.

The equipment may further comprise a heat storage unit suitable for storing heat from the external fluid which has circulated in the vicinity of the second heat exchanger.

The equipment may also comprise an additional heating device arranged upstream of the treatment system.

A second aspect of the invention relates to the use of a heat pump in equipment for heating with a large temperature differential an external fluid from a source fluid, the temperature differential being greater than 20° C., preferably greater than 30° C., in particular greater than 40° C., more particularly greater than 60° C., and allowing achieving a high target temperature Tc that is greater than 90° C., said heat pump comprising:
- first and second heat exchangers adapted to exchange heat respectively with the source fluid located in the vicinity of the first heat exchanger and the external fluid located in the vicinity of the second heat exchanger, each of said first and second heat exchangers having an inlet and an outlet,
- a coolant selected from among a hydrofluorocarbon coolant and a hydrofluoroolefin refrigerant,
- a coolant circuit suitable for circulating the coolant between the first and second heat exchangers, said coolant circuit comprising a compression unit having an inlet connected to the outlet of the first heat exchanger and an outlet connected to the inlet of the second heat exchanger, and an expansion unit having an inlet connected to the outlet of the second heat exchanger and an outlet connected to the inlet of the first heat exchanger, wherein the second heat exchanger and the coolant circuit are suitable for circulating the coolant in a transcritical cycle, said equipment comprising:
a chamber having an inlet and an outlet, the first and second heat exchangers being respectively arranged near the outlet and near the inlet of the chamber,
a treatment system located in the chamber, the inlet and the outlet of the chamber being respectively arranged upstream and downstream of the treatment system,
an external fluid circuit suitable for circulating the external fluid successively in the vicinity of the second heat exchanger and in the vicinity of the treatment system, the external fluid circuit being further suitable for circulating the external fluid downstream of the treatment system and in the vicinity of the first heat exchanger, as the source fluid, such that the external fluid transfers heat as it passes the treatment system, with a large temperature differential between the external fluid upstream of the treatment system and the external fluid downstream of the treatment system.

In particular, the heat pump can be used in equipment for drying a material to be dried, the treatment system being a drying rack intended to receive material to be dried, the external fluid circuit being suitable for circulating air successively in the vicinity of the second heat exchanger, in the vicinity of the drying rack, and in the vicinity of the first heat exchanger.

BRIEF DESCRIPTION OF THE DRAWINGS

Other features and advantages of the invention will be apparent from reading the following description of a particular embodiment of the invention given by way of non-limiting example, the description being made with reference to the accompanying drawings in which.

DETAILED DESCRIPTION

In the figures, the same references are used to denote identical or similar elements.

Figure 1:
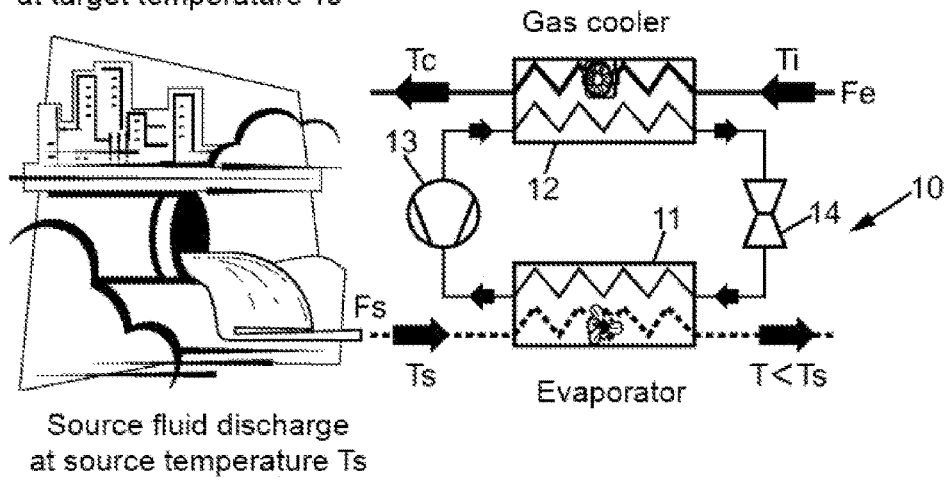
FIG. 1 is a schematic representation of a heat pump according to an embodiment of the invention, said heat pump using a coolant selected from among a hydrofluorocarbon coolant and a hydrofluoroolefin coolant in a transcritical cycle in order to heat with a large temperature differential an external fluid from a source fluid.

FIG. 1 shows a heat pump 10 for heating with a large temperature differential an external fluid Fe from a source fluid FS. Without being limited to this example, the heat pump 10 of FIG. 1 is used in an application where dry air is the external fluid Fe that is being heated from an initial temperature Ti, for example 60° C., to a target temperature Tc, for example 120° C., with humid air as the source fluid Fs at a source temperature Ts, for example 50° C.

Depending on the application concerned, the external fluid may be any fluid other than dry air and the source fluid may be any fluid other than humid air. In addition, the differential between the initial temperature and the target temperature of the external fluid may be different from the abovementioned differential, and in particular can be any differential constituting a large temperature differential, meaning a temperature differential greater than 20° C., preferably greater than 30° C., in particular greater than 40° C., more particularly greater than 60° C., and which allows reaching a high target temperature Tc, greater than 90° C., in particular greater than 100° C., preferably greater than 120° C., and for example up to 150° C., starting from a source temperature, in particular greater than 40° C., more particularly greater than 50° C. and for example up to 70° C.

The heat pump 10 comprises a first heat exchanger 11 through which humid air can flow as the source fluid Fs, and a second heat exchanger 12 through which dry air can flow as the external fluid Fe. The first 11 and second 12 heat exchangers are connected to each other by a coolant circuit comprising:
a compression unit 13 having an inlet connected to an outlet of the first heat exchanger 11 and an outlet connected to the inlet of the second heat exchanger 12, and
an expansion unit 14 having an inlet connected to an outlet of the second heat exchanger 12 and an outlet connected to the inlet of the first heat exchanger 11.

A coolant can thus flow in the coolant circuit, between the first heat exchanger 11 and the second heat exchanger 12. The first heat exchanger 11 forms an evaporator in which the coolant collects heat from the humid air at the source temperature Ts, and the second heat exchanger 12 forms a condenser or gas cooler in which the coolant releases heat to the dry air in order to raise it from the initial temperature Ti to the target temperature Tc.

According to the invention, the coolant is a hydrofluorocarbon coolant. In particular, the chosen hydrofluorocarbon coolant is difluoromethane (R-32).

Alternatively, the coolant may be a coolant selected from among the hydrofluoroolefins.

The coolant has a critical point, with a critical temperature and a critical pressure. To ensure heating at a large temperature differential, the compression unit 13 is adapted to compress the coolant so that it simultaneously presents, at the outlet of the compression unit 13 and at the inlet of the gas cooler 12, a supercritical pressure greater than the critical pressure and a supercritical temperature greater than the critical temperature.

In addition, the gas cooler 12 is adapted to cool the coolant in a supercritical fluid state. The coolant is then simultaneously at a supercritical pressure greater than the critical pressure and at a supercritical temperature greater than the critical temperature, as it enters the gas cooler 12, and the cooling of the coolant takes place at constant supercritical pressure. The gas cooler 12 is designed according to the properties of the coolant in its supercritical fluid state, to allow reaching the desired temperature in the external fluid. The geometry of the gas cooler 12 is determined (typology, exchange surface area, shape, number of passes, etc.) so as to maintain a fixed minimum differential between the evolving temperatures of the coolant and of the external fluid to be heated. This temperature differential is set based on economic criteria.

As will be apparent from the rest of the description, the coolant can thus circulate in the heat pump 10 in a transcritical cycle.

Figure 2:
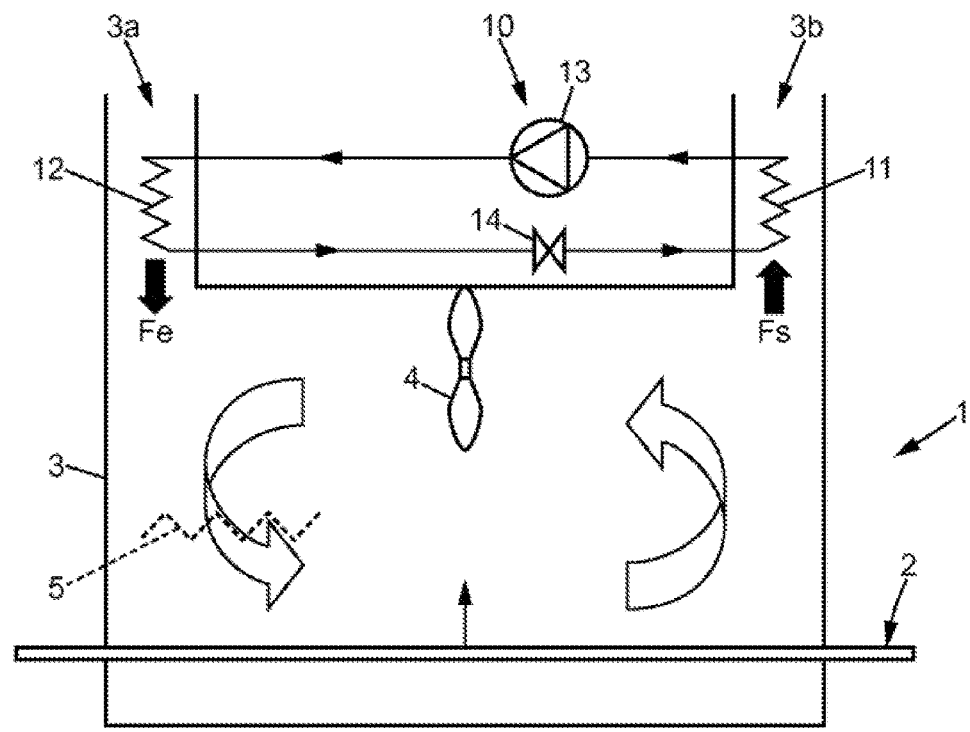
FIG. 2 is a diagrammatic representation of drying equipment making use of the heat pump of FIG. 1.

As shown in FIG. 2, the heat pump 10 described above can be utilized in equipment 1 comprising a treatment system 2 with the gas cooler 12 arranged upstream, and an external fluid circuit adapted for circulating the external fluid Fe successively in the vicinity of the gas cooler 12 and in the vicinity of the treatment system 2.

The treatment system 2 is generally a system where the treatment uses the heat that the external fluid Fe collected as it passes the gas cooler 12. The external fluid Fe releases this heat as it passes the treatment system 2, with a large temperature differential between the external fluid upstream of the treatment system 2 and the external fluid 2 downstream of the treatment system 2.

In the particular application represented in FIG. 2, the heat pump 10 is utilized in drying equipment 1. Drying at high temperatures offers many advantages (increases the drying speed, reduces the product dwell time, reduces dryer size, heat losses, reduced investment, etc.) for products that are not heat-sensitive. To dry materials, the most common method is to blow dry hot air into a chamber 3. This hot air, now moisture-laden, is then discharged to outside the chamber 3. The drying process requires contributing a large amount of energy, upstream for heating or dehumidifying the incoming dry air, or during the product dehydration phase. In addition, heat losses related to drying operations in industry account for about 40 TWh. The energy considerations related to recovering heat from the humid exhaust air from dryers are therefore very important.

As shown in FIG. 2, the drying equipment 1 thus comprises the chamber 3 in which the treatment system 2, which is in the form of a drying rack receiving the material to be dried, is arranged. The chamber 3 has an inlet 3a and an outlet 3b respectively arranged upstream and downstream of the drying rack 2.

The heat pump 10 is placed in the chamber 3, with the evaporator 11 and the gas cooler 12 respectively arranged near the outlet 3b and the inlet 3a of the chamber 3. In FIG. 2, the inlet 3a and the outlet 3b of the chamber 3 each comprise a conduit in which the corresponding heat exchanger is placed. Alternatively, the heat pump 10 could be positioned outside the chamber 3.

An external fluid circuit 4, in particular comprising a fan, is then provided to circulate incoming dry air as the external fluid Fe, from the inlet 3a of the chamber 3, upstream of the drying rack 2, toward the drying rack 2 through the gas cooler 12, where appropriate via an additional heating device such as an electrical resistor 5. The external fluid circuit can then circulate the extracted humid air that has traveled past the material to be dried, as the source fluid Fs, downstream of the drying rack 2 toward the evaporator 11. The evaporator 11 recovers heat from the extracted humid air Fs and the gas cooler 12 heats the incoming dry air Fe.

Employing a heat pump 10 that uses a hydrofluorocarbon (HFC) coolant or a hydrofluoroolefin (HFO) coolant in a transcritical cycle allows recovering the greatest portion of the lost energy, by cooling the extracted humid air Fs to a temperature low enough to condense a substantial portion of the water contained in the air, then lifting the temperature using the heat pump 10 in order to transfer this thermal energy into the chamber 3.

The use of a hydrofluorocarbon (HFC) coolant or a hydrofluoroolefin (HFO) coolant in a transcritical cycle appropriate for the temperature ranges imposed by applications with large temperature differentials allows significantly increasing the performance of the heat pump 10. This thermodynamic cycle is the most important contributing factor in the overall efficiency of drying equipment 1 with a heat pump.

Specific design dimensions for the above heat pump 10 operating with HFC R-32 coolant in a transcritical cycle are given by way of non-limiting illustrative example, in heat recovery implemented with humid air saturated at 50° C. for heating dry air from 60° C. to 120° C. Such an implementation corresponds to the drying application described above.

Gas Cooler 12

Figure 3:
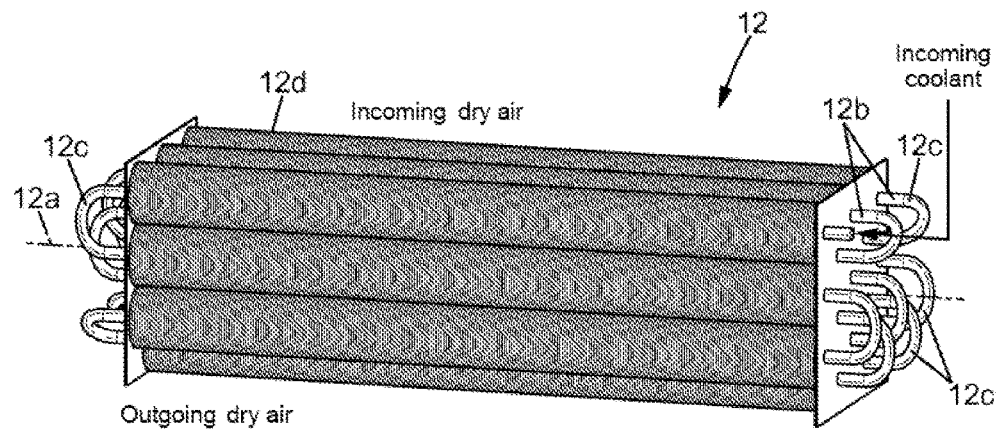
FIG. 3 is a perspective view of a gas cooler transferring heat to the external fluid within the heat pump of FIG. 1.

A possible gas cooler geometry is proposed in FIG. 3.

A modeling based on passes through a tubular gas cooler 12 with round fins allows proposing this geometry for the implementation in question. The gas cooler 12 extends along a longitudinal axis 12a. It forms a serpentine composed of axial tubes 12b having ends connected by elbows 12c. Fins 12d extend perpendicularly from each of the tubes 12b.

A heat exchange capacity of about 40 kW is considered in this example. In the gas cooler 12, the pressure is maintained at 80 bar and the coolant is flowing countercurrent to the air.

The geometry is summarized in Table 1 below.

TABLE 1

| Tube geometry | | Fin geometry | |
|---|---|---|---|
| Inside diameter | 1.8 cm | Fin type | round |
| Tube thickness | 1 mm | Fin diameter | 10 cm |
| Tube length | 3 m | Fin thickness | 1 mm |
| Number of passages per row | 3 | Fin pitch | 6 mm |
| | | Number of fins per pass | 500 |
| Number of rows | 5 | | |
| Number of passes | 15 | | |
| Total tube length | 45 m | | |

Compression Unit 13

The compression unit 13 comprises, in the particular case where R-32 is used as the coolant, the current technologies of high pressure compressors such as the GEA HAX2 CO2 T Bock compressor (semi-hermetic two cylinder reciprocating compressor).

Other high pressure compressor technologies can be used, for example the GEA Grasso screw compressor adapted for the highest capacities.

Evaporator 11

Figure 4:
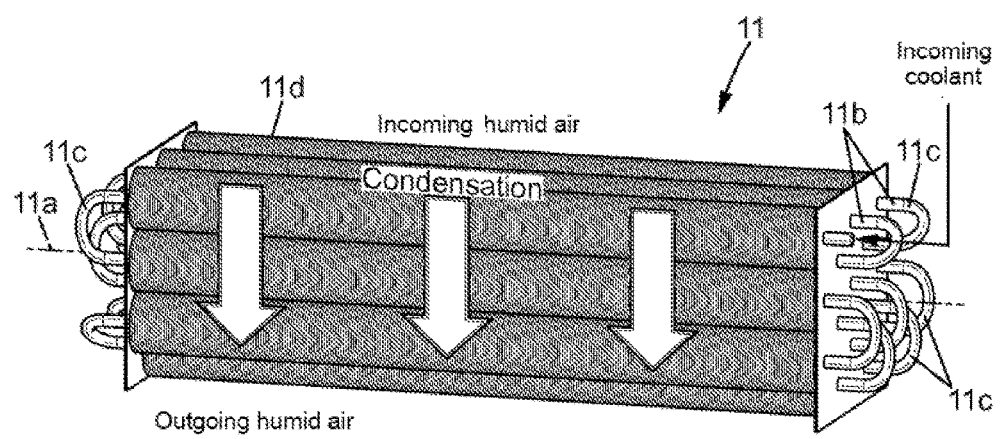
FIG. 4 is a perspective view of an evaporator collecting heat from the source fluid within the heat pump of FIG. 1, FIGS. 5a and 5b are temperature-entropy diagrams respectively illustrating the transcritical thermodynamic cycle of the hydrofluorocarbon coolant R-32 in the heat pump of FIG. 1, and the subcritical thermodynamic cycle of the hydrofluorocarbon coolant R-245fa in a conventional heat pump.

A possible geometry for the evaporator 11 is provided in FIG. 4.

A modeling based on passes through a tubular evaporator 11 with round fins allows proposing this geometry for the implementation in question. The evaporator 11 has a geometry similar to that of the gas cooler 12. In particular, the evaporator 11 extends along a longitudinal axis 11a and forms a serpentine composed of axial tubes 11b having ends connected by elbows 11c. Fins 11d extend perpendicularly from each of the tubes 12b.

For this evaporator, the heat exchange capacity is 35 kW. The flow is countercurrent and the pressure is 25 bar.

The geometry is summarized in Table 2 below.

TABLE 2

| Tube geometry | | Fin geometry | |
|---|---|---|---|
| Inside diameter | 1.8 cm | Fin type | round |
| Tube thickness | 1 mm | Fin diameter | 10 cm |
| Tube length | 2 m | Fin thickness | 1 mm |
| Number of passages per row | 5 | Fin pitch | 3 mm |
| Number of rows | 4 | | |
| Number of passes | 20 | | |
| Total tube length | 40 m | | |

Figure 5A:
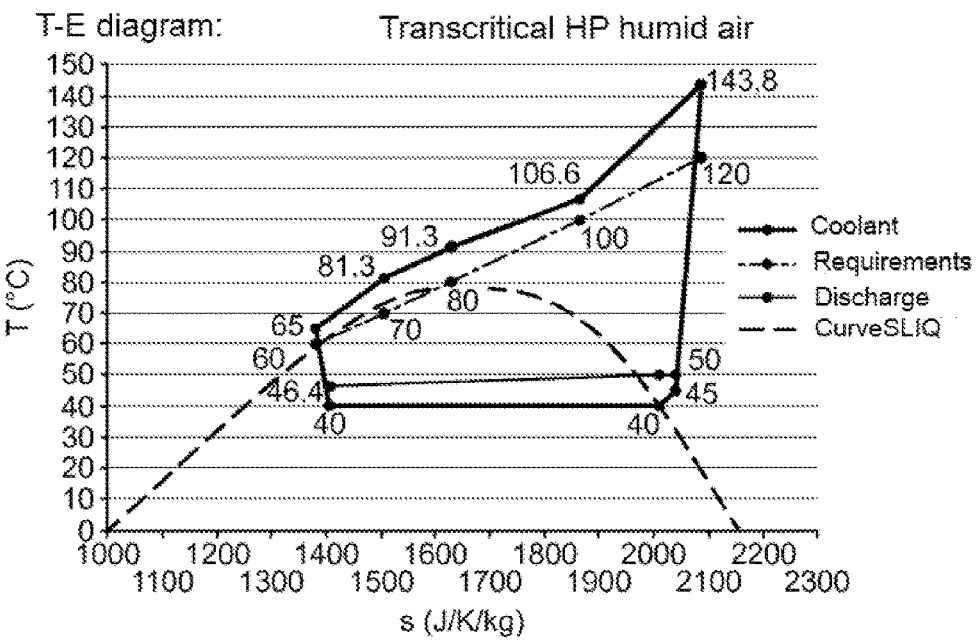

The transcritical thermodynamic cycle of coolant R-32 in the heat pump 10 with gas cooler 12, compression unit 13, and evaporator 11 is shown in FIG. 5a in the form of a temperature-entropy diagram. This diagram highlights the ranges of values for the pressures and temperatures reached at the discharge of the compression unit 13 and at the entrance of the gas cooler 12. It is particularly apparent that the values achieved are located above the saturation curve.

The performances and capacities involved are summarized in Table 3 below.

TABLE 3

| | |
|---|---|
| $Q_{condenser}$ [W] | 45118 |
| $Q_{compresser}$ [W] | 10412 |
| $Q_{evaporator}$ [W] | 33788 |
| $Q_{fan}$ [W] | 118.35 |
| $Q_{fan}/Q_{comp}$ | 1.1% |

Figure 5B:
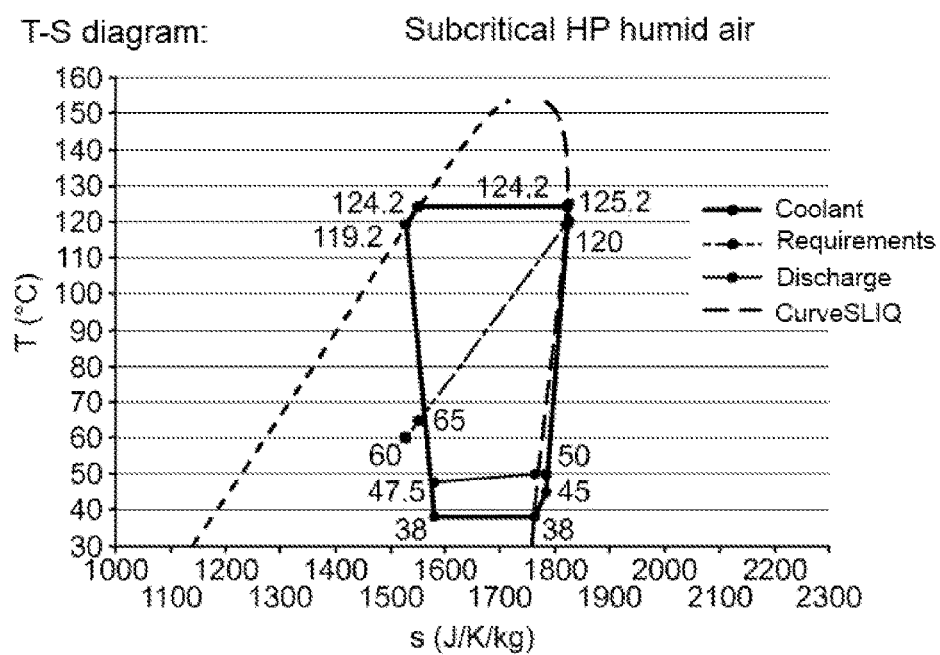

In Table 4 below, the thermodynamic performance of the heat pump HP is calculated for the cycle using HFC R-32 in transcritical and compared to a subcritical cycle with HFC R-245fa, shown in FIG. 5b, in a similar implementation where dry air is heated from 60° C. to 120° C. using moisture-saturated air at a temperature of 50° C. and at a rate of 1 kg/s.

TABLE 4

| | Release rate (kg/s) | Rate required (kg/s) | COP Actual | COP Carnot | Exergy efficiency (%) |
|---|---|---|---|---|---|
| Subcritical cycle of HFC-245fa | 1 | 1 | 2.18 | 4.98 | 44 |
| Transcritical cycle of HFC R-32 | 1 | 1 | 4.06 | 6.27 | 65 |

Thus, for a heat pump recovering thermal energy from humid air saturated at 50° C. in order to heat dry air from 60 to 120° C. (i.e. an industrial drying application), the use of difluoromethane (R-32) in a transcritical cycle changes the COP from about 2 to more than 4. The use of HFC R-32 coolant in transcritical conditions appropriate for the temperature ranges imposed by the drying application allows reducing energy consumption by a factor of 2 compared to a conventional thermodynamic cycle using a pure substance subcritically (for example HFC-R245fa).

The invention described above in relation to drying equipment 1 has other applications, particularly in gas treatment equipment making use of appropriate treatment systems.

Depending on the application considered, the equipment may include a separate source fluid circuit distinct from the external fluid circuit and adapted to circulate air successively in the vicinity of the evaporator 11 and in the vicinity of the treatment system. In addition, when there is an intermittent demand for heat, the equipment may include a heat storage unit adapted to store heat from the external fluid that has circulated in the vicinity of the gas cooler 12.

The invention claimed is:

1. A method of using a heat pump in equipment for industrial drying of a material chosen among wood and sludge,
    the equipment comprising said heat pump comprising:
    first and second heat exchangers adapted to exchange heat respectively with a source fluid located in the vicinity of the first heat exchanger and an external fluid located in the vicinity of the second heat exchanger, each of said first and second heat exchangers having an inlet and an outlet,
    a coolant wherein the coolant is hydrofluorocarbon coolant R-32,
    a coolant circuit suitable for circulating the coolant between the first and second heat exchangers, said coolant circuit comprising a high pressure compression unit having an inlet connected to the outlet of the first heat exchanger and an outlet connected to the inlet of the second heat exchanger, and an expansion unit having an inlet connected to the outlet of the second heat exchanger and an outlet connected to the inlet of the first heat exchanger,
    said equipment further comprising:
    a chamber in which the heat pump is arranged, the chamber having an inlet and an outlet, the first and second heat exchangers being respectively arranged near the outlet and near the inlet of the chamber,
    a treatment system located in the chamber, the inlet and the outlet of the chamber being respectively arranged upstream and downstream of the treatment system, the treatment system being a drying rack intended to receive the material to be dried,
    a circuit of external fluid,
    the method comprising:
    arranging the material on the drying rack,
    circulating air as the source fluid and the external fluid between the inlet and the outlet of the chamber, air circulating successively in the vicinity of the second heat exchanger, in the vicinity of the drying rack, and in the vicinity of the first heat exchanger,
    circulating the coolant in a transcritical cycle within the heat pump so that air is heated with a temperature differential greater than 40° C. and has a target temperature upstream the drying rack that is greater than 120° C.

2. The method according to claim 1, wherein the temperature differential is greater than 60° C.

* * * * *